(12) United States Patent
Greib et al.

(10) Patent No.: US 6,679,524 B2
(45) Date of Patent: Jan. 20, 2004

(54) TENSION SENSING ASSEMBLY

(75) Inventors: Gary R. Greib, Lake Orion, MI (US); Thomas W. Miller, Warren, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/156,850

(22) Filed: May 29, 2002

(65) Prior Publication Data

US 2003/0089544 A1 May 15, 2003

Related U.S. Application Data

(60) Provisional application No. 60/333,264, filed on Nov. 14, 2001.

(51) Int. Cl.$^7$ .......................... B60R 22/00; B60R 22/48
(52) U.S. Cl. ................. 280/801.1; 180/268; 73/862.69; 324/207.2
(58) Field of Search ................ 180/268; 280/801.1, 280/735; 324/200, 207.21, 207.2; 73/779, 862.391, 862.69

(56) References Cited

U.S. PATENT DOCUMENTS

| | | |
|---|---|---|
| 3,618,378 A | 11/1971 | Shull et al. |
| 3,784,972 A | 1/1974 | Hults |
| 3,817,093 A | 6/1974 | Williams |
| 3,868,662 A | 2/1975 | Russell, Jr. |
| 4,424,509 A | 1/1984 | Andres et al. |
| 4,574,911 A | 3/1986 | North |
| 4,677,861 A | 7/1987 | Bartholomew |
| 4,742,886 A | 5/1988 | Sato |
| 4,805,467 A | 2/1989 | Bartholomew |
| 4,943,087 A | 7/1990 | Sasaki |
| 4,979,400 A | 12/1990 | Bartholomew |
| 5,060,977 A | 10/1991 | Saito |
| 5,087,075 A | 2/1992 | Hamaue |
| 5,181,739 A | 1/1993 | Bauer et al. |
| 5,309,135 A | 5/1994 | Langford |
| 5,364,129 A | 11/1994 | Collins et al. |
| 5,454,591 A | 10/1995 | Mazur et al. |
| 5,494,311 A | 2/1996 | Blackburn et al. |
| 5,570,903 A | 11/1996 | Meister et al. |
| 5,570,932 A | 11/1996 | Collins et al. |
| 5,583,476 A | 12/1996 | Langford |
| 5,590,904 A | 1/1997 | Ellis et al. |
| 5,605,348 A | 2/1997 | Blackburn et al. |

(List continued on next page.)

FOREIGN PATENT DOCUMENTS

WO     WO 99/55559     11/1999

OTHER PUBLICATIONS

"Magnetic Field Sensors for Magnetic Position Sensing in Automotive Applications", Joseph P. Heremans, General Motors Research and Development Corporation, Apr. 1, 1997.

Primary Examiner—Paul N. Dickson
Assistant Examiner—Ruth Ilam
(74) Attorney, Agent, or Firm—Scott A. McBain

(57) ABSTRACT

A tension sensing assembly for a seat restraint system in a vehicle includes a housing and a movable mechanism disposed in the housing. The tension sensing assembly also includes at least one spring disposed in the housing and cooperable with the movable mechanism. The tension sensing assembly includes at least one magnet disposed in the housing and a Hall effect sensor disposed in the housing and cooperable with the at least one magnet. The tension sensing assembly further includes a cable extending through the housing and cooperable with the movable mechanism to move the movable mechanism to deflect the at least one spring. The movable mechanism moves the at least one magnet relative to the Hall effect sensor to change an output of the Hall effect sensor to indicate a tension level in the seat restraint system when the at least one spring is deflected.

23 Claims, 3 Drawing Sheets

U.S. PATENT DOCUMENTS

| | | |
|---|---|---|
| 5,618,056 A | 4/1997 | Schoos et al. |
| 5,636,864 A | 6/1997 | Hori |
| 5,728,953 A | 3/1998 | Beus et al. |
| 5,732,974 A | 3/1998 | Sayles |
| 5,775,618 A | 7/1998 | Krambeck |
| 5,831,172 A | 11/1998 | Kidd |
| 5,871,232 A | 2/1999 | White |
| 5,960,523 A | 10/1999 | Husby et al. |
| 5,965,827 A | 10/1999 | Stanley et al. |
| 5,996,421 A | 12/1999 | Husby |
| 6,081,759 A | 6/2000 | Husby et al. |
| 6,161,439 A | 12/2000 | Stanley |
| 6,205,868 B1 * | 3/2001 | Miller .................. 73/862.391 |
| 6,209,915 B1 | 4/2001 | Blakesley |
| 6,230,088 B1 | 5/2001 | Husby |
| 6,301,977 B1 | 10/2001 | Stojanovski |
| 6,336,371 B1 * | 1/2002 | O'Boyle .................. 73/865.9 |
| 6,363,793 B2 | 4/2002 | O'Boyle |
| 6,400,145 B1 * | 6/2002 | Chamings et al. ..... 324/207.26 |
| 6,454,304 B1 * | 9/2002 | Steffens, Jr. ............. 280/801.1 |
| 6,502,860 B1 * | 1/2003 | Siegfried et al. ........ 280/801.1 |
| 6,554,318 B2 * | 4/2003 | Kohut et al. ............. 280/801.1 |
| 2002/0104383 A1 * | 8/2002 | Chamings et al. ............ 73/826 |
| 2003/0024326 A1 * | 2/2003 | Blakesly et al. ....... 73/862.391 |

* cited by examiner

TENSION SENSING ASSEMBLY

CROSS-REFERENCE TO RELATED APPLICATION(S)

The present invention claims the priority date of copending U.S. Provisional Patent Application Serial No. 60/333,264, filed Nov. 14, 2001.

TECHNICAL FIELD

The present invention relates generally to seat restraint systems for vehicles and, more particularly, to a tension sensing assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Smart inflatable restraint systems need to know what is occupying a seat of the vehicle. Decisions on deployment of inflatable restraints depend on information supplied by sensors in the seat in determining weight of an object in the seat. When a child seat is placed in the seat and cinched down, the sensors may read a large mass instead of a child seat. With this condition, there will be high tension in the seat restraint system. Comfort studies have shown that no human occupant would wear their seat restraint that tight. With this information on seat restraint tension, the inflatable restraint system can decide on deployment of the inflatable restraints.

Therefore, it is desirable to provide an assembly for sensing tension in a seat restraint system of a vehicle. It is also desirable to provide an assembly for sensing tension in a seat restraint system in a vehicle that allows a control module to decide on deployment of the inflatable restraints. It is further desirable to provide an assembly for sensing tension in a seat restraint system in a vehicle that mates with an existing buckle frame and provides an indication of high-tension forces in the seat restraint system. It is still further desirable to provide an assembly for sensing tension in a seat restraint system incorporating a cable attachment. Therefore, there is a need in the art to provide a tension sensing assembly that meets these desires.

SUMMARY OF THE INVENTION

It is, therefore, one object of the present invention to provide a new tension sensing assembly for sensing tension in a seat restraint system of a vehicle.

It is another object of the present invention to provide an assembly for tension sensing in a seat restraint system of a vehicle incorporating a cable attachment.

To achieve the foregoing objects, the present invention is a tension sensing assembly for a seat restraint system in a vehicle including a housing and a movable mechanism disposed in the housing. The tension sensing assembly also includes at least one spring disposed in the housing and cooperable with the movable mechanism. The tension sensing assembly includes at least one magnet disposed in the housing and a Hall effect sensor disposed in the housing and cooperable with the at least one magnet. The tension sensing assembly further includes a cable extending through the housing and cooperable with the movable mechanism to move the movable mechanism to deflect the at least one spring. The movable mechanism moves the at least one magnet relative to the Hall effect sensor to change an output of the Hall effect sensor to indicate a tension level in the seat restraint system when the at least one spring is deflected.

One advantage of the present invention is that a new tension sensing assembly is provided for a seat restraint system in a vehicle. Another advantage of the present invention is that the tension sensing assembly may be mounted on a buckle or inboard side of the vehicle or an anchor or outboard side of the vehicle. Yet another advantage of the present invention is that the tension sensing assembly may be packaged directly underneath a buckle assembly and is designed to mate with an existing buckle frame. Still another advantage of the present invention is that the tension sensing assembly incorporates a cable attachment to provide flexible presentation of the buckle assembly and allows for attachment to a pretensioner, if required. A further advantage of the present invention is that the tension sensing assembly incorporates a flexible cable to reduce bending moment due to inboard loading and allows the tension sensing assembly to stay in line with the buckle assembly. Yet a further advantage of the present invention is that the tension sensing assembly incorporates a boot that covers a portion of the buckle and the entire tension sensing assembly and can be attached with a snap or screw to the tension sensing assembly. Still a further advantage of the present invention is that the tension sensing assembly provides a reduction in overall package size and reduces the amount of parts.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
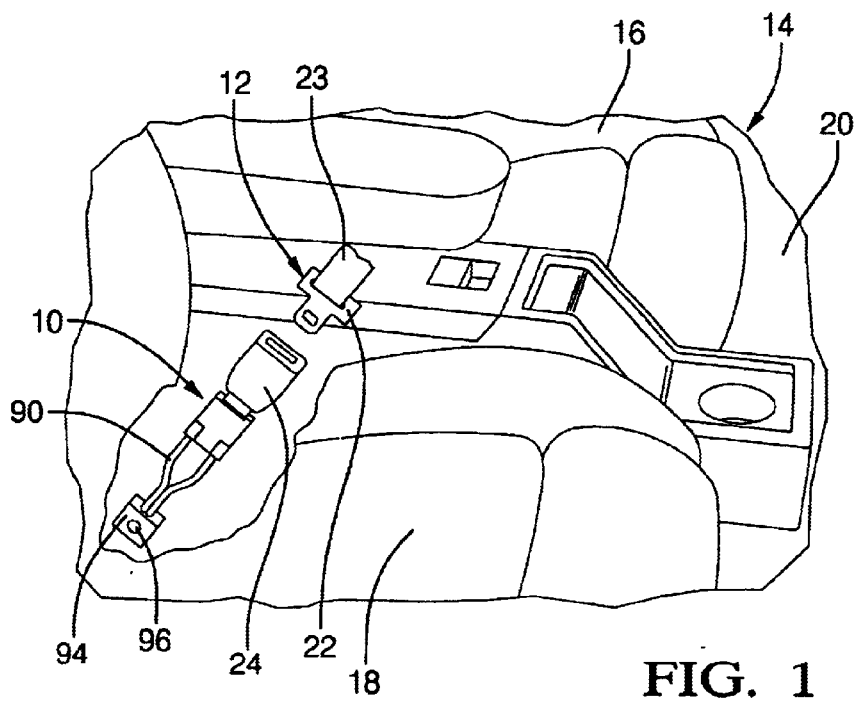
FIG. 1 is a perspective view of a tension sensing assembly, according to the present invention, illustrated in operational relationship with a seat restraint system of a vehicle.

Referring to the drawings and in particular FIG. 1, one embodiment of a tension sensing assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure such as a floorpan (not shown) in an occupant compartment 20 of the vehicle body 16. In this embodiment, the seat 18 is a front seat of the vehicle 14. It should be appreciated that the seat 18 could be a rear, second row, or third row seat for the vehicle 14.

Figure 2:
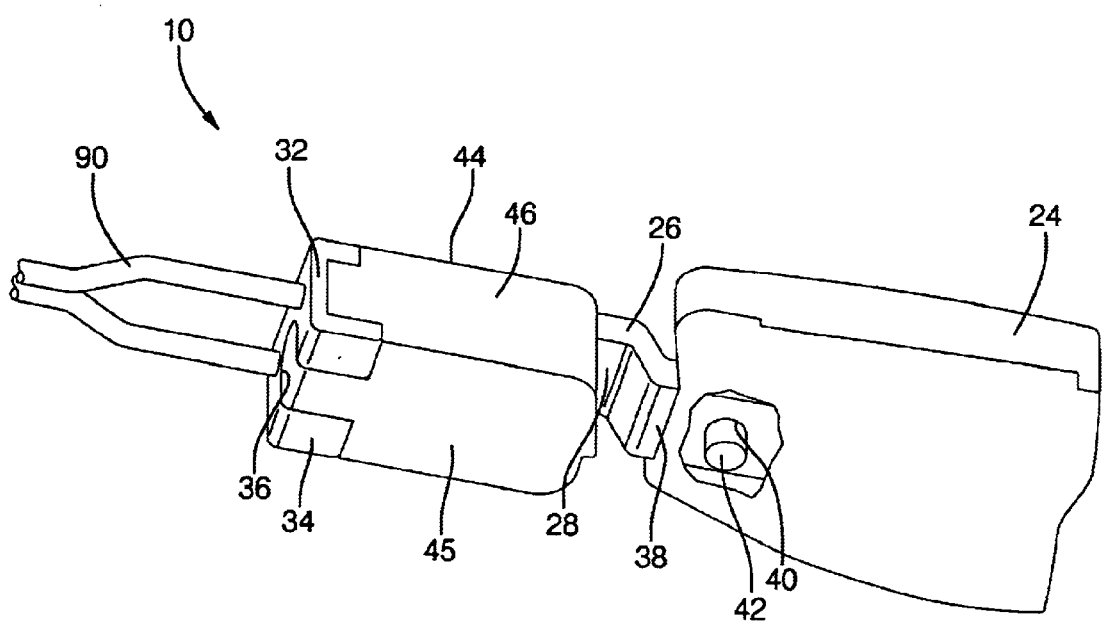
FIG. 2 is a perspective view of the tension sensing assembly of FIG. 1.

Referring to FIGS. 1 and 2, the vehicle 14 includes the seat restraint system 12 for restraining an occupant (not shown) in the seat 18. The seat restraint system 12 includes a latch tongue or plate 22 connected to belt webbing 23 at an end of either one of a lap belt, shoulder belt, or both which have another end connected to a retractor (not shown). The seat restraint system 12 also includes a buckle assembly 24 for receiving the latch plate 22. The tension sensing assembly 10 is connected to the buckle assembly 24 and to vehicle structure in a manner to be described. It should be appreciated that the latch plate 22 is engageable and disengageable with the buckle assembly 24. It should also be appreciated that, except for the tension sensing assembly 10, the seat restraint system 12 and vehicle 14 are conventional and known in the art.

Referring to FIGS. 1 through 4, the tension sensing assembly 10, according to the present invention, includes an anchor plate 26 extending longitudinally. The anchor plate 26 has a base portion 28 that is generally rectangular in shape. The base portion 28 has at least one mounting aperture 30 extending therethrough to act as a mounting hole for a function to be described. It should be appreciated that one mounting aperture 30 is preferred and allows a housing 44 to be described to have corner radii, which reduces the area of the package and improves the overall appearance of the assembly 10.

The anchor plate 26 has a side portion 32 extending generally perpendicular to the base portion 28 and a top portion 34 extending generally perpendicular to the side portion 32 to form a general "C" shape. The side portion 32 and top portion 34 have a slot 36 extending therethrough for a function to be described. The side portion 32 also has a pair of apertures 37 extending longitudinally therethrough with each of the apertures 37 being disposed on each side of the slot 36.

The anchor plate 26 also has an end flange 38 extending longitudinally from the other end of the base portion 28. The end flange 38 has an aperture 40 extending therethrough and is connected to a frame of the buckle assembly 24 by suitable means such as a fastener 42, preferably a rivet. The fastener 42 extends through the aperture 40 in the anchor plate 26 and the frame of the buckle assembly 24 and is secured in place. The anchor plate 26 is made of a rigid material such as metal, preferably steel. It should be appreciated that the fastener 42 is conventional and known in the art. It should also be appreciated that the anchor plate 26 is fixed to the buckle assembly 24 by the fastener 42.

The tension sensing assembly 10 also includes a housing 44 mounted on or connected to the anchor plate 26. The housing 44 is generally rectangular in shape. The housing 34 has a base wall 45 and opposed lateral side walls 46 and longitudinal end walls 48 extending generally perpendicular from the base wall 45 to form a cavity 50. One of the end walls 48 has a plurality, preferably a pair, of apertures 52 extending longitudinally therethrough and spaced laterally at a rearward longitudinal end for a function to be described. The end wall 48 has a central slot 53 disposed therein between the apertures 52 for a function to be described. The other end wall 48 has a generally circular boss 54 formed therein with an aperture 56 extending therethrough and is connected to the anchor plate 26 by suitable means such as a fastener 58, preferably a screw. The fastener 58 extends through the mounting aperture 30 in the anchor plate 26 and the aperture 56 of the boss 54 to secure the housing 44 and the anchor plate 26 together. A gasket or seal 59 (partly shown) such as an o-ring may be disposed between the housing 44 and anchor plate 26 to seal the anchor plate 26 to the housing 44. The seal 59 is made of a flexible material such as an elastomeric material. The housing 44 is made of a rigid material such as plastic, preferably nylon. It should be appreciated that the housing 44 is a monolithic structure being integral, unitary, and one-piece.

The tension sensing assembly 10 includes a movable slider 60 disposed in the cavity 50 of the housing 44. The slider 60 has a base portion 62 which is generally rectangular in shape and has a width approximately the same as or less than a width of the cavity 50 of the housing 44 for sliding movement therein. The base portion 62 has a plurality, preferably a pair, of spring pockets 64 extending longitudinally therein and spaced laterally at a rearward longitudinal end. The base portion 62 includes a plurality, preferably a pair, of apertures 65 extending longitudinally therethrough from each spring pocket 64. The apertures 65 have a diameter less than the spring pockets 64 for a function to be described. The base portion 62 also has a central cavity 66 extending longitudinally therein at a rearward longitudinal end for a function to be described. The slider 60 has a protrusion portion 68 extending longitudinally at a forward longitudinal end. The protrusion portion 68 has at least one, preferably a plurality of ribs 70 spaced longitudinally and extending laterally from each lateral side thereof. The protrusion portion 68 has a longitudinal end 72 with a generally arcuate shape for a function to be described. The slider 60 also has a pair of flange portions 74 extending longitudinally at a forward longitudinal end and spaced laterally. The flange portions 74 are generally arcuate in shape and extend toward each other. The flange portions 74 have a flange 76 extending longitudinally to dispose the boss 54 therebetween. The slider 60 is made of a rigid material such as plastic or metal and formed as a monolithic structure being integral, unitary, and one-piece. It should be appreciated that the slider may have two contact surfaces on each side thereof to reduce the chance of the slider 60 tilting in the housing 44. It should also be appreciated that the two contact surfaces limits the chance that contamination on a flat side area of the slider 60 would have any frictional effect since it would not be rubbing on the side of the housing 44.

The tension sensing assembly 10 also includes at least one, preferably a plurality of, more preferably two, springs 78 disposed within the cavity 50 of the housing 44 between the end wall 48 of the housing 44 and the slider 60. The springs 78 are tuned to a predetermined force for a high-tension condition to have an output of approximately eight pounds (8 lb.) to approximately thirty pounds (30 lb.). The springs 78 are of a coil type having a first end disposed in the spring pockets 64 and contacting the slider 60 and a second end contacting the end wall 48 of the housing 44. The springs 78 are made of a spring material. It should be appreciated that the slider 60 deflects or compresses the springs 78 when the slider 60 is moved relative to the housing 44.

Figure 3:
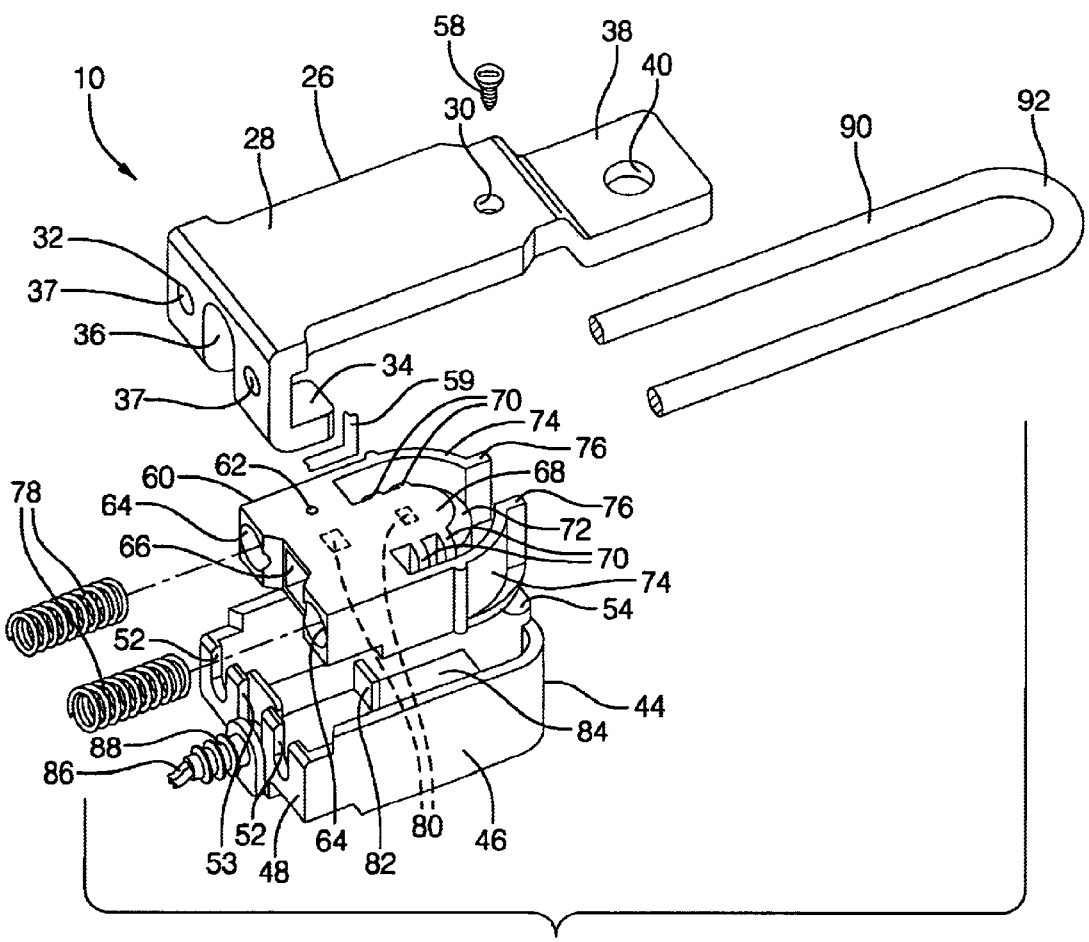
FIG. 3 is an exploded perspective view of the tension sensing assembly of FIGS. 1 and 2.
Figure 4:
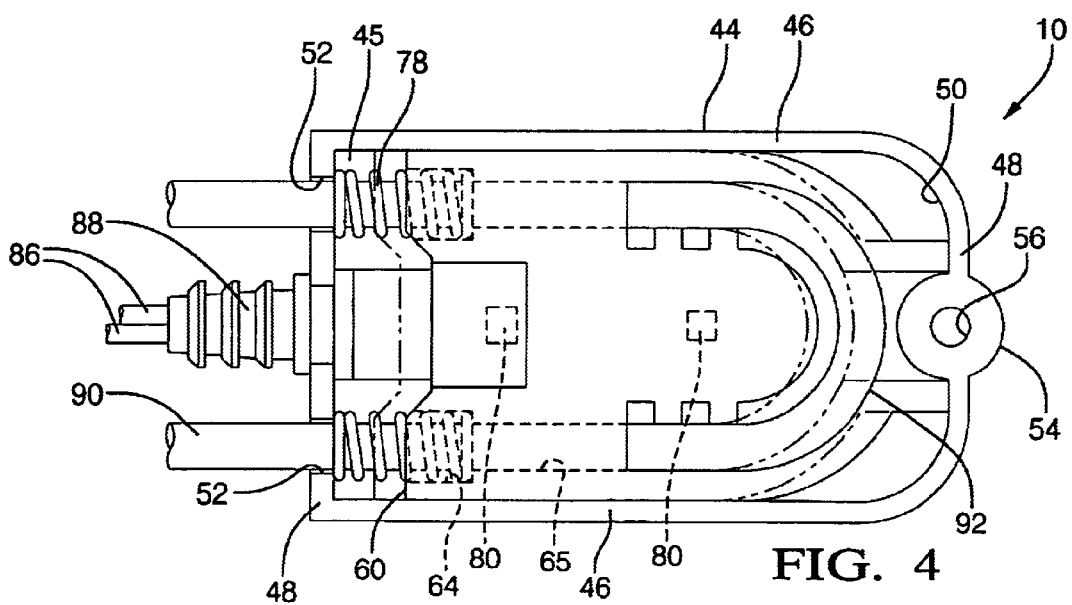
FIG. 4 is a plan view of the tension sensing assembly of FIGS. 1 and 2 illustrating the tension sensing assembly in a low-tension condition and a high-tension condition.

Referring to FIGS. 3 and 4, the tension sensing assembly 10 includes at least one, preferably a plurality, more preferably a pair, of magnets 80 disposed in the cavity 66 of the slider 60. The magnets 80 are spaced longitudinally from each other. The magnets 80 are mounted on the slider 60, preferably molded or die-cast into the slider 60 and charged during assembly.

The tension sensing assembly 10 also includes a Hall effect sensor 82 disposed in the cavity 50 of the housing 44. The Hall effect sensor 82 is spaced longitudinally between the magnets 80 and is mounted on a printed circuit board 84 connected to the base wall 45 and is potted or encapsulated and connected by electrical leads or wires 86 to a source of power such as a controller (not shown) of the vehicle. The magnets 80 are moved by the slider 60 relative to the Hall effect sensor 82 during a high-tension condition. The tension sensing assembly 10 may include a lead wire nipple 88 disposed over the ends of the wires 86 connected to the circuit board 84 and cooperating with the slot 53 in the end wall 48 of the housing 44 to retain the wires 86 relative to the housing 44. It should be appreciated that the slider 60 moves as the springs 78 are deflected and this motion moves the magnets 80 relative to the Hall effect sensor 82 in a pull-pull arrangement. It should also be appreciated that the position of the magnets 80 relative to the Hall effect sensor 82 changes the output signal. It should further be appreciated that the Hall effect sensor 82 is preferably centered between the magnets 80.

The tension sensing assembly 10 further includes a flexible cable 90 extending through the housing 44 and cooperating with the slider 60 for attachment to vehicle structure. The cable 90 is made of a flexible metal material such as steel. The cable 90 extends through the apertures 37 in the anchor plate 26, the springs 78, apertures 65 in the slider 60, and forms a generally arcuate portion 92 about the end 72 of the slider 60. The free ends of the cable 90 are disposed outside of the anchor plate 26 and may be attached to vehicle structure or to a pretensioner (not shown). It should be appreciated that the apertures 37 in the anchor plate 26 trap the cable 90. It should also be appreciated that the springs 78 are mounted directly over the cable 90 and the cable 90 prevents the springs 78 from binding or collapsing inward relative to their inside diameters. Is should further be appreciated that the cable 90 provides flexible presentation of the buckle assembly 24. It should still further be appreciated that the cable 90 reduces bending moment due to inboard loading and the tension sensing assembly 10 stays in line with the buckle assembly 24. It should be appreciated that the apertures 37 in the anchor plate 26 trap the cable 90. It should also be appreciated that the tension sensing assembly 10 is protected from fluid spills because the apertures 37 in the anchor plate 26 are located on a bottom of the anchor plate 26.

Referring to FIG. 1, the tension sensing assembly 10 may include an anchor plate 94 connected to vehicle structure by suitable means such as an anchor bolt 96. The anchor plate 94 has an aperture (not shown) extending therethrough to receive the free ends of the cable 90. The free ends of the cable 90 may be secured together and are secured either to the anchor plate 94 or anchor bolt 96 by suitable means such as welding. The anchor plate 94 is made of a rigid material such as metal. The tension sensing assembly 10 may include a boot (not shown) that covers a portion of the buckle assembly 24 and the entire tension sensing assembly 10 and is attached thereto by suitable means such as snaps or screws. It should be appreciated that the anchor bolt 96 is conventional and known in the art. It should also be appreciated that the anchor plate 94 is fixed by the anchor bolt 96. It should further be appreciated that, in another embodiment, the tension sensing assembly 10 is secured by the anchor bolt 96 to vehicle structure and that the free ends of the cable 90 are secured to the frame of the buckle assembly 24. It should still further be appreciated that the boot, in yet another embodiment, is designed to present the buckle assembly 24, yet not restrict webbing tension transmission to the tension sensing assembly 10.

In operation of the tension sensing assembly 10, when the latch plate 22 is not latched with the buckle assembly 24 as illustrated in FIG. 2, the Hall effect sensor 82 transmits a no tension signal. It should be appreciated that the slider 60 of the tension sensing assembly 10 is spring loaded to an initial position by the springs 78 as indicated by the solid lines in FIG. 4.

When the occupant buckles the seat restraint system 12, the tension in the belt webbing 23 is lower than a predetermined load required to deflect the springs 78 as illustrated by the solid lines in FIG. 4. In this state, the tension sensing assembly 10 will send an output signal to the controller. The controller uses the output signal for weight compensation along with a weight signal from a bladder (not shown) in the seat 18 to decide on deployment of an inflatable restraint (not shown). It should be appreciated that the seat restraint system 12 is in a low-tension condition as illustrated by the solid lines in FIG. 4. It should also be appreciated that the tension sensing assembly 10 functions similar to a load cell to measure load and send the signal to the controller.

When a child seat (not shown) is placed in the seat 18 and the seat restraint system 12 is buckled, the belt webbing 23 is cinched to pull the child seat tightly into the seat 18. As the tension is increased in the belt webbing 23, the contact force on the slider 60 via the cable 90 increases. The resistive force of the springs 78 reacts against the increased tension. When the tension in the belt webbing 23 exceeds the predetermined load, the slider 60 moves as the springs 78 are deflected or compressed, thereby moving the magnets 80 relative to the Hall effect sensor 82 in a pull-pull arrangement as illustrated by the phantom lines in FIG. 4. This movement changes the output of the Hall effect sensor 82. The controller uses the output signal for weight compensation along with a weight signal from a bladder (not shown) in the seat 18 to decide on deployment of an inflatable restraint (not shown). It should be appreciated that the seat restraint system 12 is in a high-tension condition as illustrated by the phantom lines in FIG. 4. It should also be appreciated that an audible tone or visual indication may be provided when the tension in the belt webbing 23 is increased above a predetermined level. It should further be appreciated that the tension sensing assembly 10 could be used as an analogue device.

Figure 5:
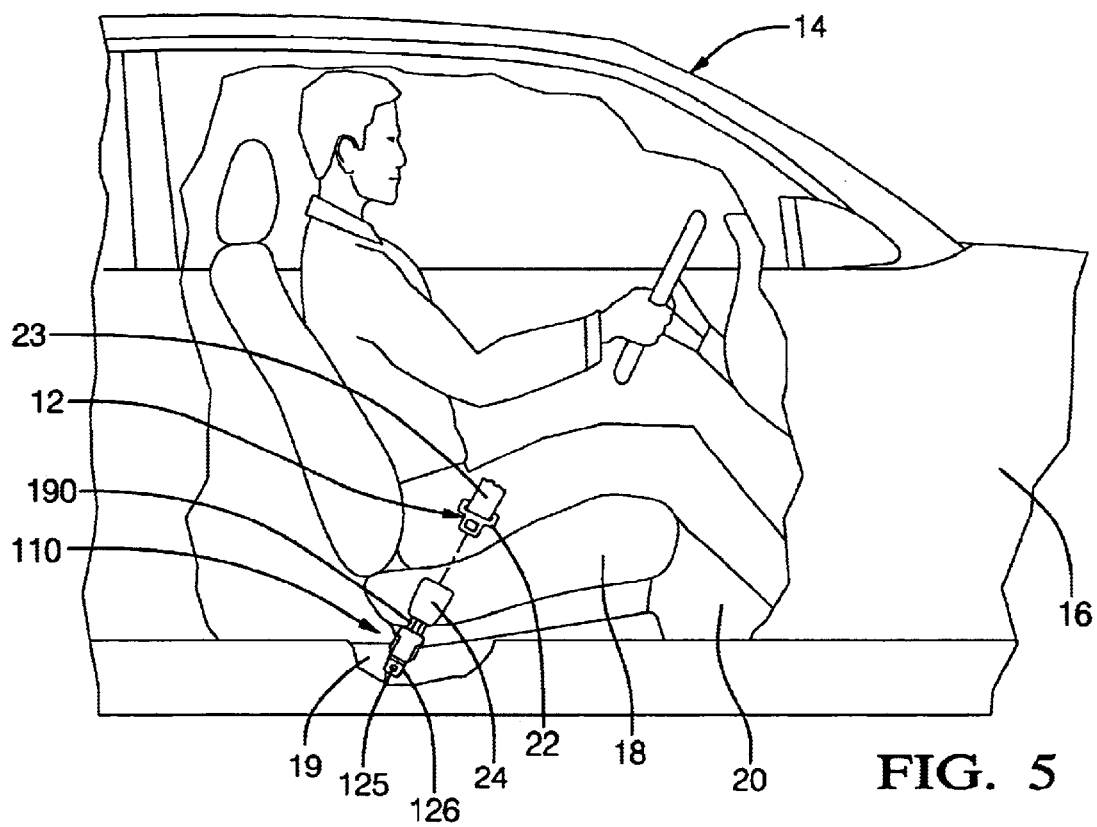
FIG. 5 is an elevational view of another embodiment, according to the present invention, of the tension sensing assembly of FIG. 1 illustrated in operational relationship with a seat restraint system of a vehicle.

Referring to FIG. 5, another embodiment, according to the present invention, of the tension sensing assembly 10 is shown for the seat restraint system 12 in the vehicle. Like parts of the tension sensing assembly 10 have like reference numerals increased by one hundred (100). In this embodiment, the tension sensing assembly 110 is reverse mounted or mounted upside down on the inboard or buckle side of the seat 18. The tension sensing assembly 110 includes the ends of the cable 190 attached to the frame of the buckle assembly 24 by suitable means such as crimping. The tension sensing assembly 110 has the anchor plate 126 connected to vehicle structure such as the floorpan 19, by suitable means such as an anchor bolt 125. It should be appreciated that the tension sensing assembly 110 operates similar to the tension sensing assembly 10.

Figure 6:
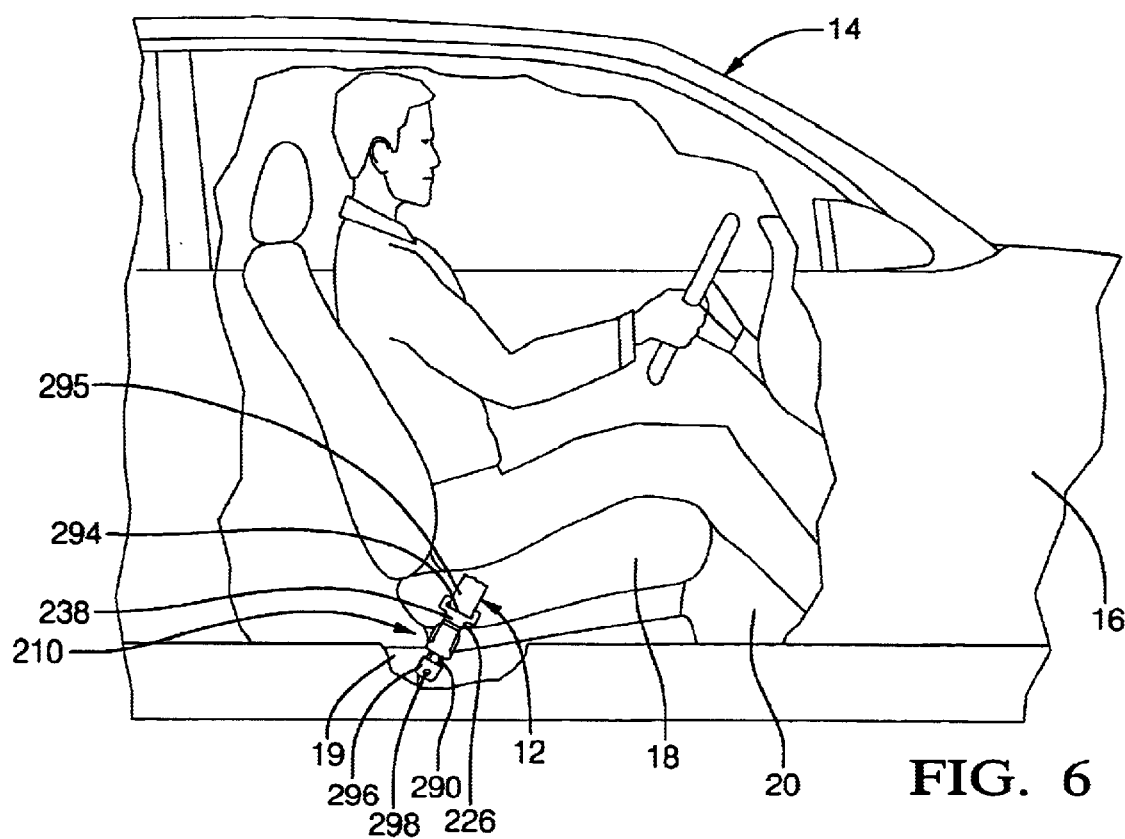
FIG. 6 is an elevational view of yet another embodiment, according to the present invention, of the tension sensing assembly of FIG. 1 illustrated in operational relationship with a seat restraint system of a vehicle.

Referring to FIG. 6, yet another embodiment, according to the present invention, of the tension sensing assembly 10 is shown for the seat restraint system 12 in the vehicle. Like parts of the tension sensing assembly 10 have like reference numerals increased by two hundred (200). In this embodiment, the tension sensing assembly 210 is mounted on an outboard or anchor side of the seat 18. The tension sensing assembly 210 includes the end flange 238 of the anchor plate 226 having an aperture or web slot 294 therein to receive seat belt webbing 295 of the seat restraint system 12. The ends of the cable 290 are attached to an anchor plate 296 by suitable means such as crimping. The anchor plate 296 is connected to vehicle structure, such as the floorpan 19, by suitable means such as an anchor bolt 298. It should be appreciated that the tension sensing assembly 210 operates similar to the tension sensing assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tension sensing assembly for a seat restraint system in a vehicle comprising:
   a housing;
   a movable mechanism disposed in said housing;
   at least one spring disposed in said housing and cooperable with said movable mechanism;
   at least one magnet disposed in said housing;
   a Hall effect sensor disposed in said housing and cooperable with said at least one magnet; and
   a cable extending through said housing and cooperable with said movable mechanism to move said movable mechanism to deflect said at least one spring, said movable mechanism moving said at least one magnet and said Hall effect sensor toward each other to change an output of said Hall effect sensor to indicate a tension level in the seat restraint system when said at least one spring is deflected.

2. A tension sensing assembly as set forth in claim 1 wherein said movable mechanism includes at least one spring pocket extending therein to receive one end of said at least one spring.

3. A tension sensing assembly as set forth in claim 2 wherein said movable mechanism includes at least one aperture extending longitudinally therethrough and communicating with said at least one spring pocket, said cable extending through said at least one spring and said at least one aperture.

4. A tension sensing assembly as set forth in claim 1 including an anchor plate connected to said housing.

5. A tension sensing assembly for a seat restraint system comprising:
   a housing;
   a movable mechanism disposed in said housing;
   at least one spring disposed in said housing and cooperable with said movable mechanism;
   at least one magnet disposed in said housing;
   a Hall effect sensor disposed in said housing and cooperable with said at least one magnet;
   a cable extending through said housing and cooperable with said movable mechanism to move said movable mechanism to deflect said at least one spring, said movable mechanism moving said at least one magnet relative to said Hall effect sensor to change an output of said Hall effect sensor to indicate a tension level in the seat restraint system when said at least one spring is deflected; and
   an anchor plate connected to said housing, wherein said anchor plate includes at least one aperture extending therethrough, said cable extending through said at least one aperture.

6. A tension sensing assembly as set forth in claim 5 wherein said anchor plate is adapted to be connected to one of a buckle assembly of the seat restraint system, seat belt webbing of the seat restraint system, and the vehicle structure.

7. A tension sensing assembly as set forth in claim 1 wherein said movable mechanism comprises a slider disposed in said housing.

8. A tension sensing assembly for a seat restraint system comprising:
   a housing;
   a movable mechanism disposed in said housing;
   at least one spring disposed in said housing and cooperable with said movable mechanism;
   at least one magnet disposed in said housing;
   a Hall effect sensor disposed in said housing and cooperable with said at least one magnet;
   a cable extending through said housing and cooperable with said movable mechanism to move said movable mechanism to deflect said at least one spring, said movable mechanism moving said at least one magnet relative to said Hall effect sensor to change an output of said Hall effect sensor to indicate a tension level in the seat restraint system when said at least one spring is deflected; and
   said movable mechanism comprising a slider disposed in said housing, wherein said slider has a protrusion extending longitudinally with an arcuate shaped longitudinal end, said cable extending around said longitudinal end.

9. A tension sensing assembly as set forth in claim 8 wherein said protrusion has at least one rib extending laterally therefrom for contacting said cable.

10. A tension sensing assembly as set forth in claim 8 wherein said at least one magnet is fixed to said slider and said Hall effect sensor is fixed to said housing.

11. A tension sensing assembly as set forth in claim 1 wherein said at least one spring is a coil spring tuned to a predetermined force.

12. A tension sensing assembly for a seat restraint system in a vehicle comprising:
   an anchor plate adapted to be connected to one of a buckle assembly of the seat restraint system, seat belt webbing of the seat restraint system, and vehicle structure;
   a housing connected to said anchor plate;
   at least one spring disposed in said housing;
   at least one magnet disposed in said housing;
   a Hall effect sensor disposed in said housing and cooperable with said at least one magnet;
   a slider disposed in said housing; and
   a cable extending through said housing and said at least one spring and being cooperable with said slider to move said slider to deflect said at least one spring, said slider moving said at least one magnet and said Hall effect sensor toward each other to change an output of said Hall effect sensor to indicate a tension level in the seat restraint system when said at least one spring is deflected.

13. A tension sensing assembly as set forth in claim 12 wherein said slider includes at least one spring pocket extending therein to receive one end of said at least one spring.

14. A tension sensing assembly as set forth in claim 13 wherein said slider includes at least one aperture extending longitudinally therethrough and communicating with said at least one spring pocket, said cable extending through said at least one spring and said at least one aperture.

15. A tension sensing assembly for a seat restraint system comprising:
   an anchor plate adapted to be connected to one of a buckle assembly of the seat restraint system, seat belt webbing of the seat restraint system, and vehicle structure;
   a housing connected to said anchor plate;
   at least one spring disposed in said housing;
   at least one magnet disposed in said housing;
   a Hall effect sensor disposed in said housing and cooperable with said at least one magnet;
   a slider disposed in said housing;
   a cable extending through said housing and cooperable with said slider to move said slider to deflect said at least one spring, said slider moving said at least one magnet relative to said Hall effect sensor to change an output of said Hall effect sensor to indicate a tension level in the seat restraint system when said at least one spring is deflected; and
   wherein said anchor plate includes at least one aperture extending therethrough, said cable extending through said at least one aperture.

16. A tension sensing assembly for a seat restraint system comprising:
   an anchor plate adapted to be connected to one of a buckle assembly of the seat restraint system, seat belt webbing of the seat restraint system. and vehicle structure;
   a housing connected to said anchor plate;
   at least one spring disposed in said housing;
   at least one magnet disposed in said housing;
   a Hall effect sensor disposed in said housing and cooperable with said at least one magnet;
   a slider disposed in said housing;
   a cable extending through said housing and cooperable with said slider to move said slider to deflect said at least one spring, said slider moving said at least one magnet relative to said Hall effect sensor to change an output of said Hall effect sensor to indicate a tension level in the seat restraint system when said at least one spring is deflected; and
   wherein said slider has a protrusion extending longitudinally with an arcuate shaped longitudinal end, said cable extending around said longitudinal end.

17. A tension sensing assembly as set forth in claim 16 wherein said protrusion has at least one rib extending laterally therefrom for contacting said cable.

18. A tension sensing assembly as set forth in claim 12 wherein said at least one magnet is fixed to said slider and said Hall effect sensor is fixed to said housing.

19. A tension sensing assembly as set forth in claim 12 wherein said at least one spring is a coil spring tuned to a predetermined force.

20. A tension sensing assembly as set forth in claim 12 including a seal disposed between said anchor plate and said housing.

21. A seat restraint system for a vehicle comprising:
   a seat belt buckle;
   an anchor plate connected to said seat belt buckle;
   a housing connected to said anchor plate;
   a plurality of springs disposed in said housing;
   a pair of magnets disposed in said housing and spaced longitudinally;
   a Hall effect sensor disposed in said housing and spaced longitudinally between said magnets; and
   a slider disposed in said housing; and
   a cable extending through said housing and having ends adapted to be operatively connected to vehicle structure, said cable being cooperable with said slider to move said slider to deflect said springs, said slider moving said magnets relative to said Hall effect sensor to change an output of said Hall effect sensor to indicate a tension level in the seat restraint system when said springs are deflected.

22. A seat restraint system for a vehicle comprising:
   a seat belt webbing;
   an anchor plate connected to said seat belt webbing;
   a housing connected to said anchor plate;
   a plurality of springs disposed in said housing;
   a pair of magnets disposed in said housing and spaced longitudinally;
   a Hall effect sensor disposed in said housing and spaced longitudinally between said magnets; and
   a slider disposed in said housing; and
   a cable extending through said housing and having ends adapted to be operatively connected to vehicle structure, said cable being cooperable with said slider to move said slider to deflect said springs, said slider moving said magnets relative to said Hall effect sensor to change an output of said Hall effect sensor to indicate a tension level in the seat restraint system when said springs are deflected.

23. A seat restraint system for a vehicle comprising:
   a seat belt buckle;
   an anchor plate adapted to be connected to vehicle structure;
   a housing connected to said anchor plate;
   a plurality of springs disposed in said housing;
   a pair of magnets disposed in said housing and spaced longitudinally;
   a Hall effect sensor disposed in said housing and spaced longitudinally between said magnets; and
   a slider disposed in said housing; and
   a cable extending through said housing and having ends connected to said seat belt buckle, said cable being cooperable with said slider to move said slider to deflect said springs, said slider moving said magnets relative to said Hall effect sensor to change an output of said Hall effect sensor to indicate a tension level in the seat restraint system when said springs are deflected.

\* \* \* \* \*